(No Model.)
B. F. SPARROW.
KNEADING OR BEATING APPARATUS.
No. 267,273. Patented Nov. 7, 1882.
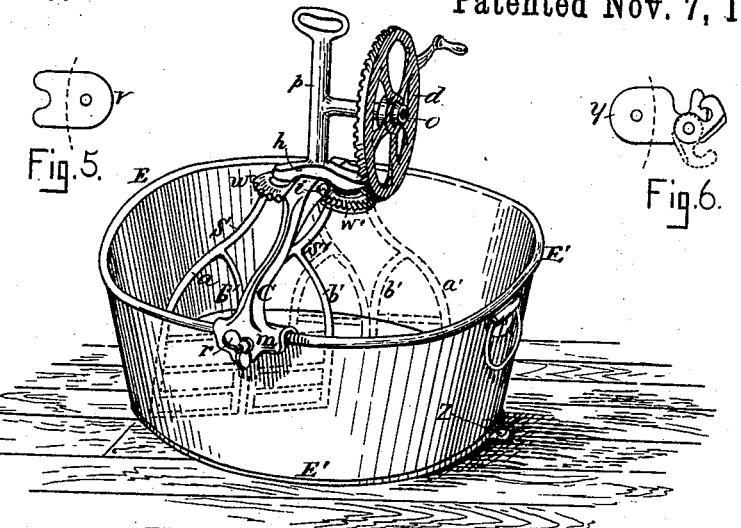
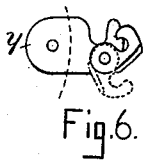
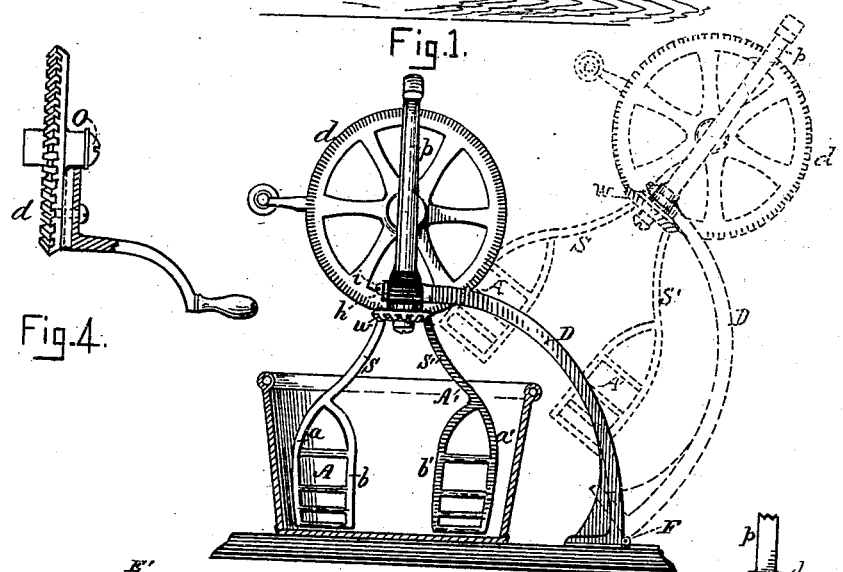
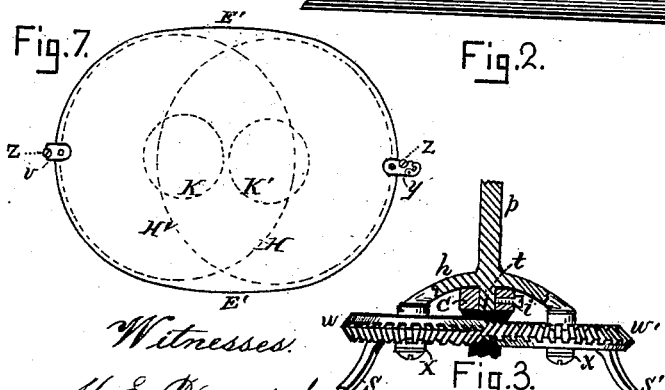
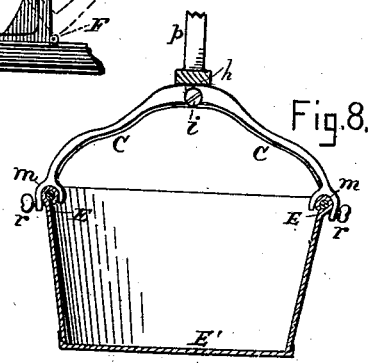
Witnesses:
H. E. Remick
Samuel Snow
Inventor:
Benjamin F. Sparrow

UNITED STATES PATENT OFFICE.

BENJAMIN F. SPARROW, OF CAMBRIDGE, MASSACHUSETTS.

KNEADING OR BEATING APPARATUS.

SPECIFICATION forming part of Letters Patent No. 267,273, dated November 7, 1882.

Application filed June 19, 1882. (No model.)

*To all whom it may concern:*

Be it known that I, BENJAMIN F. SPARROW, a citizen of the United States, residing at Cambridge, in the county of Middlesex and State of Massachusetts, have invented certain new and useful Improvements in Apparatus for Kneading or Beating any Substances to be Mixed and Stirred; and I do hereby declare that the following is a full, clear, and exact description of the invention, which will enable others skilled in the art to which it appertains to make and use the same.

My invention consists in the arrangement of a pair of stirrers of stout construction and stirrup-like in shape, each connected with its revolving apparatus by an arm or shank of requisite curvature to project it away from the center about which it is revolved, so that when both are separately and simultaneously revolved they have a sweeping movement, and, without interfering with one another, are swept around and through the receptacle in which they are operated, and by their combined movement cover and sweep every point, substantially, of the whole space within the reach of either; and it consists in combining with said stirrers, so arranged, an elongated pan conformed in shape and dimensions to the area swept by said stirrers, so that its contents are confined within the continuous action of the stirrers, and in combining said stirrers with a bail-like stand, or an arm to support and hold them in place within the said pan, and in the means of fastening said pan firmly to the support on which it rests. The two stirrers, thus made and arranged, are not designed to act, and do not act, together, like shears, to cut the material on which they operate. So far as they act together they pull and draw apart the material, while each, by its independent action, mixes and stirs the different portion it sweeps through, and which it throws from side to side and end to end of the pan, each operating alternately on the different portions. The two together, acting simultaneously, secure the thorough mixing of the whole. Cross-bars, horizontal, vertical, or inclined, and more or less numerous, according to the consistency of the material to be operated on, may be placed within the outlines of the stirrers to increase their efficiency. The said arrangement of the stirrers is effected by attaching each of them to the corresponding point of one of a pair of wheels, between the hub and the rim, by means of the curved arm or shank, which projects substantially the whole body of the stirrer beyond the rim of its wheel, as is shown in the drawings, Figures 1 and 2. They are first set in line, side by side, in the same vertical plane, the outside edge, *a'*, of one under the wheel to which the other is attached, and as near the inner edge, *b*, of the other as is consistent with the free movement of both as they pass each other. The parts traveled by the bottoms of the stirrers as they are swept around the pan are indicated in Fig. 7 by the spaces between the dotted lines H and K and the dotted lines H' and K', showing the width of sweep of the whole apparatus as about two-thirds the length thereof.

The drawings, Figs. 1 and 2, show the stirrers A A' attached to the wheels *w w'* by their shanks *s s'* about midway between hub and rim. In Fig. 1 the stirrers are shown by *a a' b b'*, the inner and outer lines of their bodies in the position in which they are first set, and also by the dotted lines *a a' b b'* in their position when they have accomplished half of one revolution. The wheels turn on journals projecting downward from the ends of the cross-bar *h*, which rests, as in Fig. 1, on the bail C, in Fig. 2, on the end of the arm D. The latter form of the support is used to advantage with a large-sized apparatus, as its support is independent of the pan, at F, where it swings on a hinge to permit the stirrers to be raised (dotted lines, Fig. 2) clear of the pan, and the pan to be removed and replaced without detaching the stirring apparatus from the place to which it may be permanently secured. The said gear-wheels are secured on the journals by the washers *x*, Fig. 3, held in place by headed screws inserted endwise into the journals.

The bail C is rigid and substantial, and is held upright by a wide foot or base, *m*, on each end, which is bent down to clasp the rim of the pan. The thumb-screw *r* fastens said foot on each end securely to its side of the pan. The post *p* is cast solid with the cross-bar *h*, and rises from the center thereof. Its prolongation *t*, Fig. 3, below the center of the cross-bar sets into the center of the bail C, or end of the arm D, and is there fastened by a screw, *i*, firmly uniting the cross-bar and post and their attachments with said bail or arm. Said post serves as a handle by which to grasp and control the apparatus when in operation, and as a support and place of attachment for an arm, the end of which, o, is the journal of the driving-wheel d.

Fig. 4 shows the driving-wheel d with handle longer than is shown in Fig. 1 or 2 for use when a slower motion and greater purchase are required. This handle is grooved on a rib raised on the wheel, and is secured thereto by a screw.

Figs. 5 and 6 show respectively the fork v and latch y, which fastens the pan in place to permanent pegs z, Fig. 7, and Fig. 7 also shows the said fork and latch riveted and soldered to the bottom of the pan.

Fig. 8 is a vertical section of the pan in front of the bail, showing the bail with its foot clasping the pan and fastened by the thumb-screws r. The lower part of the post p is shown rising from the cross-bar h, the end of which is also cut off in front of the bail C, the tongue t or prolongation of the post being set into the bail and secured by the screw i. The downward curvature of each side of the cross-bar, with the hub on the upper side of the gear-wheel, makes room over the gears, where they engage each other, for the bail.

In the drawings the same letter refers to the same part as it is shown in the several figures.

My described apparatus is specially designed for mixing cake and for beating eggs in considerable quantity. It may also be used as a churn, and for stirring together chemicals and any like material, whether dry or wet, and, when made sufficiently strong, for mixing dough.

I claim as my invention in a mixing or kneading apparatus—

1. The pair of stirrers described, arranged and connected with a pair of wheels, as described and shown, and for the purpose set forth.

2. A pair of stirrers having the arms $s\ s'$, as shown and described, and attached, as described, to any revolving apparatus, for the purpose set forth.

3. The elongated pan, as shown and described, in combination with the stirrers described, the arms $s\ s'$, and any revolving apparatus, arranged as described, for the purpose set forth.

4. The combination, as described, of the bail C or arm D, the cross-bar h, and a pair of wheels with stirrers attached, as described.

5. In combination, the driving-wheel d, post p, cross-bar h, bail C or arm D, with the gear-wheels and a pair of stirrers, all as described.

6. In combination, the pan or other receptacle, E, with the fork v and latch y, for the purpose set forth.

7. In combination, the pan E or other receptacle, and latch y, for the purpose set forth.

8. In combination, the pan or other receptacle and the bail and the broad clasped foot m, as described, for the purpose set forth.

9. An elongated pan conformed in shape and dimensions to the area swept by a pair of stirrers, arranged, as described, in combination with said stirrers, for the purpose set forth.

10. A stirrup-shaped stirrer with cross-bars, as described, for the purpose set forth and described.

BENJAMIN F. SPARROW.

Witnesses:
O. I. NOBLE,
SAMUEL SNOW.